March 22, 1955 C. E. RUSSELL ET AL 2,704,554
MULTIPLE VALVE
Filed June 26, 1948 6 Sheets-Sheet 1

Inventors.
Charles E. Russell
Chester R. Nickols

March 22, 1955

C. E. RUSSELL ET AL

2,704,554

MULTIPLE VALVE

Filed June 26, 1948

Inventors:
Charles E. Russell
Chester R. Nickols
Andrew F. Wintercorn
Atty.

Fig. 9 (SERVICE)

Fig. 10 (BACKWASH)

Inventors:
Charles E. Russell
Chester R. Nickols

March 22, 1955

C. E. RUSSELL ET AL 2,704,554

MULTIPLE VALVE

Filed June 26, 1948

Fig. 11
(BRINING)

Fig. 12
(RINSING)

Inventors:
Charles E. Russell
Chester R. Nickols

March 22, 1955   C. E. RUSSELL ET AL   2,704,554
MULTIPLE VALVE
Filed June 26, 1948   6 Sheets-Sheet 6

Inventors.
Charles E. Russell
Chester R. Nickols

United States Patent Office 2,704,554
Patented Mar. 22, 1955

2,704,554

MULTIPLE VALVE

Charles E. Russell, Wayne, and Chester R. Nickols, Sycamore, Ill.

Application June 26, 1948, Serial No. 35,404

28 Claims. (Cl. 137—625.29)

This invention relates to multiple valves of a kind particularly adapted for controlling the flows through base-exchange water softeners in the softening phase and in the several regeneration phases.

Multiple valves for the purpose mentioned may be divided into four groups:

1. Plate type valves;
2. Plug or cock type valves;
3. Plunger or cylinder type valves, and
4. Poppet type valves.

Each one of these valve types has its advantages and also its disadvantages when used for the purpose mentioned. In order to overcome the disadvantages inherent in one or the other of the valve types, many attempts have been made to modify the basic designs one way or another and these endeavors have sometimes resulted in valve structures which cannot be classified strictly as belonging to any one of the above types. The following discussion of the different types refers to them as they have been and are still being applied to use in connection with base-exchange water softeners.

The plate type multiple valve consists of a stationary base or body having a flat surface provided with ports communicating with the several inlet and outlet pipes. A rotary element, usually referred to as the stem plate, is mounted over said flat base surface and provided with ports and passages for cooperation with the ports in the base so as to establish different flow circuits through the base and stem plate in different angular positions of the stem plate. Resilient sealing means are usually provided between the cooperating surfaces of the base and stem plate, and a cover is attached to the base enclosing the stem plate.

In the plug type multiple valve, a tapered plug provided with surface recesses and/or through channels is mounted in a valve body having an interior tapered seating surface closely fitting the tapered plug and also provided with ports connected with the several inlet and outlet ports. The plug is arranged to be rotated to establish the desired flow paths and, in some cases, means are provided for imparting a slight reciprocatory movement to the plug prior to and after turning it so as to avoid scoring frictional contact between the tapered surfaces during the rotation of the plug. In this valve type resilient sealing means may also be provided between the two cooperating surfaces.

The plunger type multiple valve is essentially similar to the plug valve with the exceptions that the cooperating surfaces of the valve body and the movable plug or plunger element are not tapered but cylindrical, and the operational movement of the plunger may be rotary, or reciprocatory, or both.

The poppet type multiple valve is radically different from the three types described above, because it comprises a number of poppet valves each controlling its separate port in a common valve body containing the required flow passages and provisions for pipe connections. The individual poppet valves are operated in proper sequence by means of cams or other suitable elements, such as diaphragms subjected to water pressure which is applied and relieved through a separate pilot valve.

Common to the three first-mentioned valve types, viz: the plate, the plug, and the plunger types, is the advantageous feature of a small number of parts. They all have a body element and a single movable element for establishing all the flow circuits required, whereas in the poppet type multiple valve a number of separate valve elements have to be moved for each change of flow required in the regeneration of a water softener.

On the other hand, in the three first-mentioned valve types, there are two relatively large surfaces which move relative to one another with frictional engagement. Inasmuch as the fluid flowing through a water softener valve contains dissolved and suspended matters, often of considerable hardness, the frictional engagement causes scoring and pitting of the cooperating surfaces and consequent leakage between the separate flow circuits.

This disadvantage may be avoided entirely or in part by interposing resilient sealing means between the cooperating surfaces, but these seals often result in other difficulties and complications. Thus, for example, if the sealing means are attached to the stationary valve element, the ports in the movable element have to be moved past the sealing means in shifting from one position to another and that is apt to result in distortion or cutting of the resilient sealing means by the edges of the ports. In the plate type valves this difficulty may be avoided or at least alleviated by an arrangement whereby the stem plate is lifted straight off the sealing means prior to turning the stem plate. However, particularly in larger size valves, where the water pressure normally assists in pressing the stem plate towards the sealing means, this lifting requires considerable force and has necessitated the introduction of additional means for shutting off the water supply and/or relieving the pressure prior to shifting of the stem plate.

In the poppet type valve there is no frictional engagement of relatively movable sealing surfaces. The individual poppet valves are lifted straight off the seats without any turning or sliding movement. In large size poppet valves, however, the considerable force acting upon the valves due to the water pressure may cause water hammering and, in extreme cases, damage to the valves or the valve seats, or both.

In cases where extensive regulation of the flow rate is desirable the poppet type valve is generally inferior to the three other types in which two cooperating ports, one in the stationary element and the other in the movable element, may be arranged to register more or less completely and thus restrict the flow therethrough to a desired degree.

A plug type multiple valve may be provided with means for pressing the movable element tightly against the tapered surface of the valve body whereby the seal may be improved to a certain extent. However, that often results in objectionably hard turning of the plug as well as in difficulty in breaking the seal.

No similar means have been available for improving the sealing properties of a plunger type valve. Without special sealing means, extremely close machining with increased manufacturing cost is necessary in this case and, in most cases, even so the result is unsatisfactory due to the effect of temperature changes and other factors.

It is, therefore, one of the principal objects of the present invention to provide a multiple valve for the purpose indicated in which each flow circuit is controlled by the type of valve means best suited for the purpose. For example, it is obvious that, in the "Service" position, water should not continuously be wasted through leakage to the drain line. Thus, a prime requirement for any valve controlling the drain line is that it provides a positive seal in closed position. Adjustability in open position is not an essential requirement for this valve means. Therefore, the use of a poppet valve is indicated, preferably so arranged as to make the water pressure assist in keeping it tightly closed. In the "Backwash" position, on the other hand, adjustability of the flow rate is desirable. With a poppet type valve in the drain line, this adjustability would obviously have to be provided for in the inlet line which would indicate that the use of a poppet type valve should be avoided in the inlet line. Manifestly, however, that type of valve could be used to shut off the service line in this position, in case it is desirable to prevent any water from entering said service line. Similar considerations have been weighed in relation to the requirements for ease of operation and cost of manufacture in connection with every flow circuit established in the operation of a softener.

Another important object of the present invention is to provide a multiple valve of the kind mentioned in which the different valve means controlling the several flow circuits are so combined and so coordinated as to be operable by a single operating means of simple design.

Still another object of this invention is to provide a multiple valve of the kind indicated in which the different valve means controlling the several flow circuits are combined into a compact unit having the least possible number of movable parts consistent with optimum efficiency.

Still another object of the invention is to provide a multiple valve of the kind indicated in which requirements for precision machining are kept to a minimum by selection of suitable valve elements for each flow circuit which, as stated above, involves weighing against each other the requirements for sealing efficiency, adjustability of flow opening, and cost of machining and assembling.

Another very important object of the invention is to provide a valve of the kind mentioned, which is designed to shut off the source of water supply to the softener in the "Brine" position and place the bottom of the softener in communication with the drain, so that when the cap is removed from the top of the tank water is drained from the tank, to make room for a salt charge so as to permit regeneration of the softener by internal salting, the valve being further so designed with a shut-off range between the "Brine" and "Rinse" positions so that the operator can stop the drainage when enough water has been drained, the valve being then turned to "Rinse" position after the cap has been replaced on the tank.

The invention is illustrated in the accompanying drawings, in which—

Similar reference numerals are applied to corresponding parts throughout the views.

Figures 1, 2:
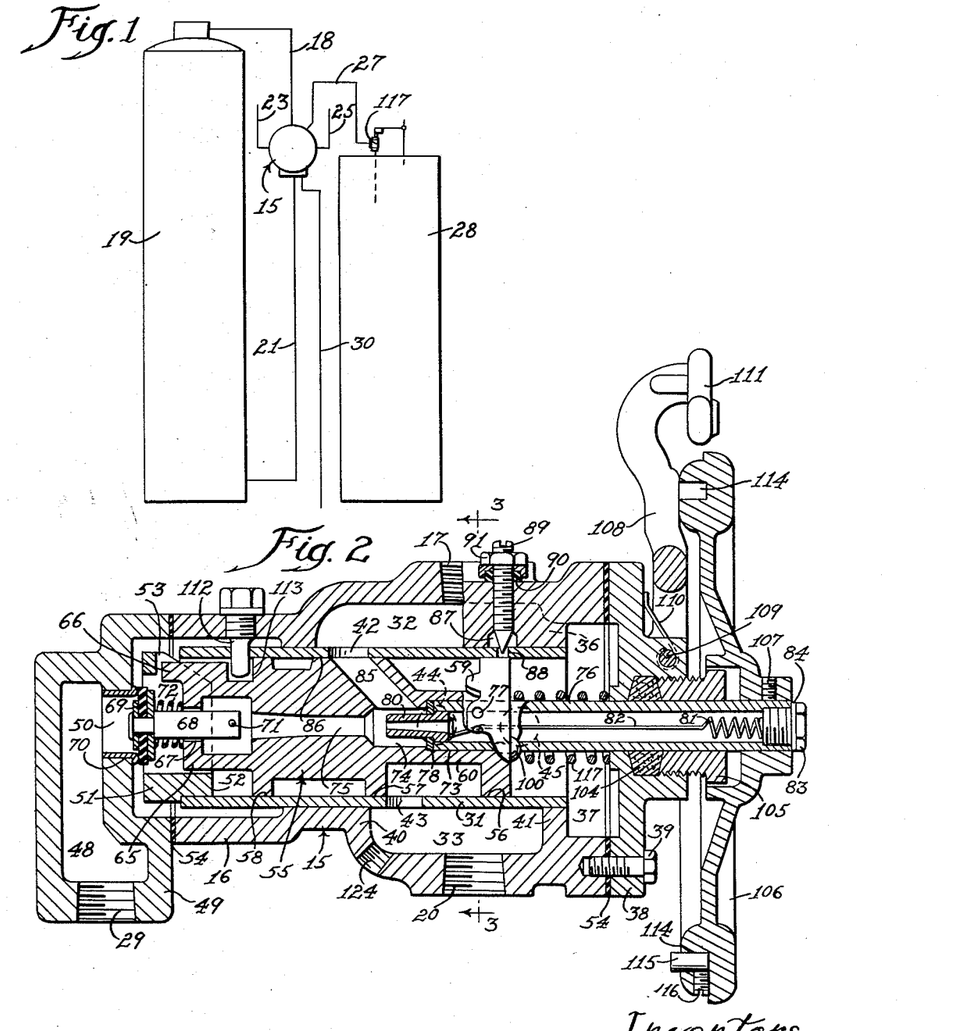
Fig. 1 is a diagrammatic illustration of a typical water softener installation showing the way in which a multiple valve like that of our invention is used to control the various flows in softening and in the several regeneration phases.
Fig. 2 is a longitudinal section through a multiple valve made in accordance with our invention, the section being mainly on line 2—2 of Fig. 3 but partly on line 2a of the same figure.

In the embodiment shown in Figs. 2 to 4 and 6 to 8 inclusive, the multiple valve indicated generally by the reference numeral 15 in Figs. 1 and 2 comprises a body element 16 provided with a number of threaded holes for pipe connections. One of these holes 17 is connected as shown in Fig. 1 through a pipe 18 with the top of a base exchange water softener 19, while another hole 20 in the same plane with hole 17 communicates with the bottom of the softener through a pipe 21. A third hole 22 in the same plane with holes 17 and 20 is connected with a source of raw water supply through a pipe 23, and a fourth hole 24 in the same plane with the other three holes communicates with a service system through a pipe 25.

Approximately in the same plane as these four holes, 17, 20, 22 and 24, and between holes 17 and 24, there is another hole 26 for a pipe connection 27 to a brine tank 28, and at the opposite end of the body 16 a threaded hole 29 is adapted to receive a pipe connection 30 going to drain, or waste.

Figure 4:
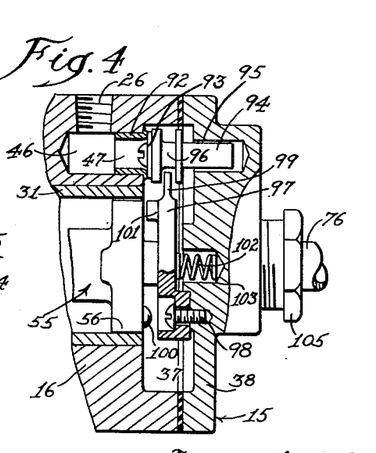
Fig. 4 is a fragmentary longitudinal section on line 4—4 of Fig. 3.

The body element 16 is provided with an interior cylindrical sleeve 31 pressed into the body with a watertight fit. Between this sleeve 31 and the body 16, chambers 32, 33, 34, 35 are formed in the body which communicate with holes 17, 20, 22, and 24, respectively. The chamber 32 is open at one end, as indicated at 36, and thus communicates freely with a chamber 37 formed in the end portion of the body 16 next to a cover 38 which closes the end of the body 16 and is secured thereto by means of screws 39. Chambers 33, 34 and 35 are closed at both ends, as indicated by walls 40 and 41 in connection with the chamber 33. The sleeve 31 is provided with four ports spaced angularly from each other about 90°. One of these ports 42 is located close to the left-hand end of the chamber 32, as viewed in Fig. 2. Farther to the right and at the opposite side of the sleeve 31 there is a port 43 which connects the chamber 33 with the interior of the sleeve 31. Still farther to the right another port 44 provides communication between the chamber 35 and the interior of the sleeve 31. And, finally, to the right of this port 44, and at the opposite side of the sleeve 31, there is a port 45 connecting the chamber 34 with the interior of the sleeve 31. The hole 26 for the brine pipe 27 is in communication with a chamber 46 in the one end portion of the body element 16 and this chamber 46 is, in turn, connected with the space 37 inside the cover 38 through a port 47 controlled by valve means to be described below. In a similar way the drain hole 29 opens into a chamber 48 in the end member 49 that is fastened onto body 16, said chamber, in turn, being connected with the interior of the body 16 through a port 50 provided in said end member 49 and also controlled by valve means to be described below.

Figure 7:
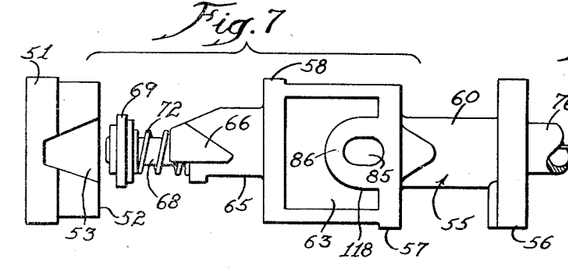
Fig. 7 is a side view of said valve plunger assembly, turned half way around from the position of Fig. 6 so as to show the opposite side, this view including a showing of the cooperating cam ring arranged to be slidably engaged by the follower on the plunger, this follower appearing in line with the V-notch in the cam face.

At the left hand end of the sleeve 31 adjacent the waste port 50, a cam ring 51 is inserted in the end of sleeve 31 and secured to the same in any suitable manner as, for instance, by a press fit, although screws or pins could be entered in radial holes through the wall of the sleeve 31 and registering with holes in the ring 51. The inner end of ring 51 provides an annular shoulder 52 around the inner circumference of the end portion of sleeve 31, said shoulder having a recessed or V-shaped cam surface 53 as shown in Fig. 7, the purpose of which will be explained later. The usual gaskets 54 are provided for water tight connections between the body 16 and cover 38, and between the body 16 and end member 49.

In order to simplify the description, that end of the valve provided with the cover 38 will hereinafter be considered the "top end," while the opposite end will be considered the "bottom end," although it is obvious that the valve may be used in any position.

Figure 6:
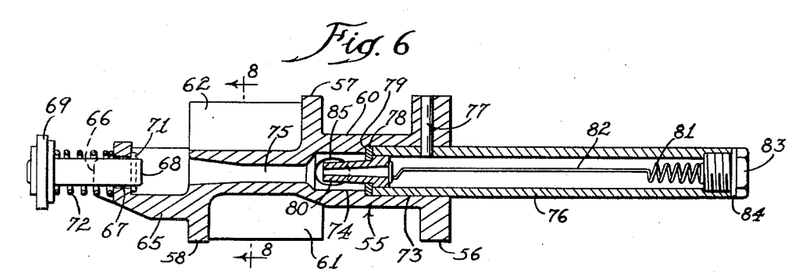
Fig. 6 is a longitudinal section through the valve plunger assembly by itself, taken in a plane at right angles to Fig. 2.
Figure 8:
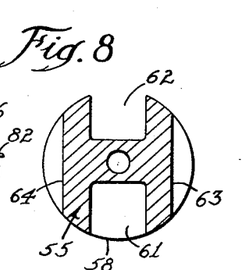
Fig. 8 is a cross-sectional detail of the valve plunger on line 8—8 of Fig. 6.

Mounted with a sliding fit within the sleeve 31 is a plunger 55 shown separately in Figs. 6 to 8. This plunger 55 has three cylindrical surfaced bearing portions 56, 57, and 58 forming seals with the interior surface of the sleeve 31. The top cylindrical bearing surface 56 has an extension 59 at the inner side thereof, the angular position and purpose of which extension is set forth later. Below the top cylindrical bearing portion 56, the plunger has a neck 60 of decreased diameter extending down to the middle cylindrical bearing portion 57 which is partly cut away so as to provide a recess 61 which extends down to, but not through, the bottom cylindrical bearing portion 58. Diametrically opposite from the recess 61 the plunger has another similar recess 62 extending through the bottom cylindrical bearing portion 58 upwards to, but not through, the middle cylindrical bearing portion 57. In order to reduce weight and save material, the plunger may or may not be provided with flat sides 63, 64 parallel to a center line through the recesses 61 and 62 and extending between the cylindrical bearing portions 57 and 58. Thus the cross-section of the plunger is substantially H-shaped between the cylindrical bearing surfaces 57 and 58, as indicated in Fig. 8. Below the bottom cylindrical bearing portion 58 the plunger is of substantially reduced diameter, as at 65, but has a cam follower 66 projecting radially therefrom to ride on the cam face formed by the shoulder 52 on, and the notch 53 in, the ring 51. The bottom end of the plunger is provided with an axial hole 67 for the stem 68 of a poppet valve 69 adapted to seat on a valve seat 70 inserted in the waste port 50 in the end member 49. The valve stem 68 is retained in the hole 67 by means of a pin 71, and a compression spring 72 surrounds the stem 68 between the valve disc 69 and the bottom end of the plunger 55, said spring tending to hold the poppet valve away from the bottom end of the plunger, whereby said valve will remain seated for a time after some initial upward movement of said plunger.

The plunger 55 is provided with a longitudinal bore comprising a top portion 73 of relatively large diameter, a middle portion 74 of less diameter, and a bottom portion 75, the diameter of which is still smaller but increases toward the bottom end of the plunger, forming a venturi. A hollow stem 76 is inserted in the top bore 73 with a tight fit, the interior of said stem 76 being connected with one or more radial holes 77 drilled in the plunger approximately at the level of the top sealing and bearing surface 56 thereof. A metal washer 78 is held by the hollow stem 76 against the shoulder 79 formed at the junction of the bores 73 and 74, and said washer 79 is provided with a central hole adapted to receive an ejector nozzle 80 with a loose fit. The form and location of this ejector nozzle 80 is such as to make it cooperate with the bore 74 to form an ejector. A coiled compression spring 81 provided with an axial extension 82 is fixed at its inner end to the ejector nozzle 80, as by soldering, and compressed by means of a threaded plug 83 screwed into the free end of the stem 76. A sealing gasket 84 may be provided beneath the head of said plug 83. The middle bore 74 in the plunger 55 has a radial passage 85 communicating with it, the outer end of which is located on a surface 86 that forms an extension of the middle annular sealing and bearing surface 57. While we have shown a removable nozzle 80 and means 81 for withdrawing the same from the stem 76, it should be understood that the nozzle 80 may be formed as an integral part of or screwed into the inner end of the stem 76, removability being mainly for easier cleaning, and the nozzle being readily accessible for rodding-out from the outer end of the stem 76 when the plug 83 is removed.

Figure 3:
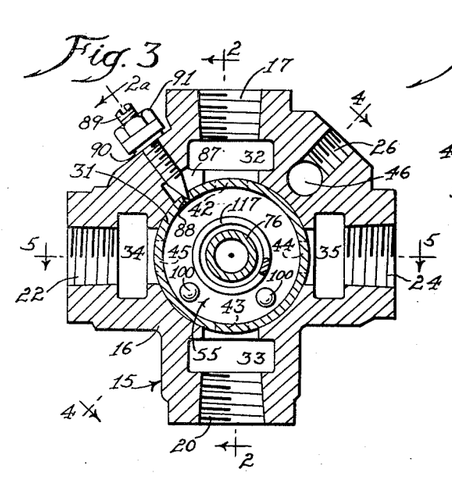
Fig. 3 is a cross-section on line 3—3 of Fig. 2.

As indicated in Fig. 3, the body chamber 32 has a lateral extension 87 which opens into the interior of the sleeve 31 through a small radial port 88 controlled by a needle valve 89 which is threaded through the body 16 and provided with a sealing gasket 90 under a washer and a lock nut 91 at the outside of said body 16.

As shown in Fig. 4, the opening 47 from the body chamber 46 has a valve seat ring 92 inserted therein for cooperation with a poppet valve disc 93 secured to a valve stem 94 which is slidably mounted in a recess 95 in the cover 38. The valve stem 94 is provided with an annularly grooved neck portion 96, and a fork-shaped lever 97 is mounted loosely at the forked end by means of two screws 98, one in each arm of the fork, for oscillation on the inner side of the cover 38 and has its other end 99 entered in the grooved neck portion 96 of the valve stem 94 with a loose fit. The top end of the plunger 55 carries two screws having heads 100 which protrude above the top surface of said plunger. The angular spacing and location of these two screw heads 100 appears in Fig. 3 and will be explained later. On the bottom side of the lever 97 is a lug 101 at the same distance from the center of the plunger as the screw heads 100, and a spring 102 located in recess 103 in the cover 38, together with another like spring acting on the other arm of the fork, normally urges the lever 97 towards the upper end of plunger 55, and holds valve 93 normally seated at 92. While we have shown the valve 93 as a separate element guided in the cover 38 and held seated by the lever 97, we may mount the valve pivotally directly on the end of the lever 97.

The hollow stem 76 extends through a central hole in the cover 38 in which seal means around the stem is provided in a stuffing box 104 and compressed by a gland nut 105 of conventional design. A hand wheel 106 is secured to the outer end of the hollow stem 76 by means of set screws 107. A forked lever 108 is hingedly connected to the cover 38 by means of a pin 109, its free end being forced toward the rim of the hand wheel 106 by a leaf spring 110 working between the cover 38 and the lever 108, as shown. The lever 108 protrudes beyond the rim of the hand wheel 106 and around it so that the protruding portion 111 thereof may be reached and pushed back against the action of the spring 110.

Although normally not needed, a pin 112 may be screwed into a hole in the wall of the body 16 and passed through a registering hole in sleeve 31 and arranged to extend radially inwardly from the wall of the sleeve 31 into a groove 113 in the plunger 55, said groove 113 being of a suitable shape so as to force the plunger 55 downwards when it is turned to a certain angular position as mentioned later.

The hand wheel 106 is provided with a circumferential groove 114 in the bottom side thereof, wherein a number of stops 115 are slidably mounted and arranged to be locked in any selected position by means of set screws 116. The stops 115 project from the hand wheel 106 sufficiently to abut against the side of the lever 108 and thus prevent further rotary movement of said hand wheel.

A compression spring 117 may be inserted between the top of the plunger 55 and the bottom of the cover 38, said spring 117 surrounding the stem 76.

The operation of the valve is illustrated diagrammatically in Figs. 9–12. In order to simplify the description, the hole 24 and port 44 have been shown in the drawing in the same plane as the hole 20 and port 43, although in reality, they are located in another portion of the body 16 and sleeve 31, respectively, as previously pointed out. The same applies to the hole 26.

Figure 9:
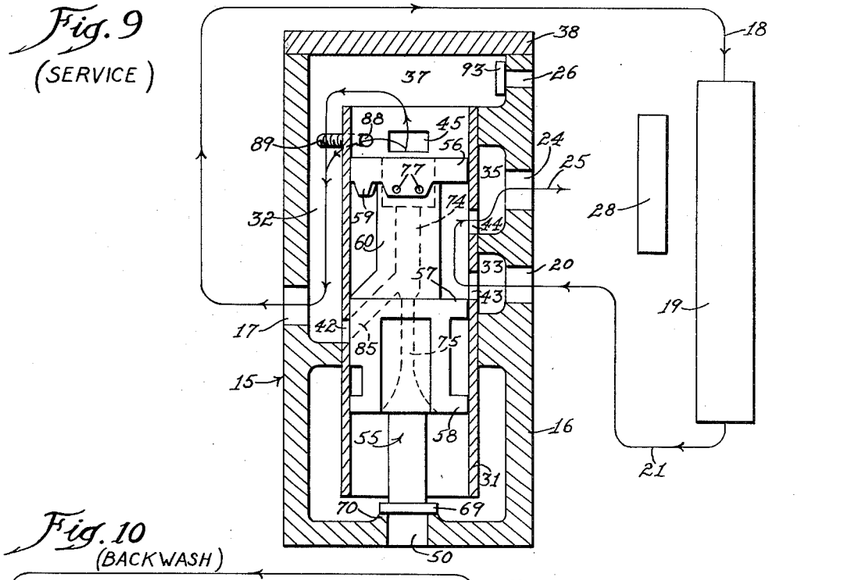
Figs. 9–12 are flow diagrams for the valve in service, backwash, brining, and rinsing, respectively.
Figure 10:
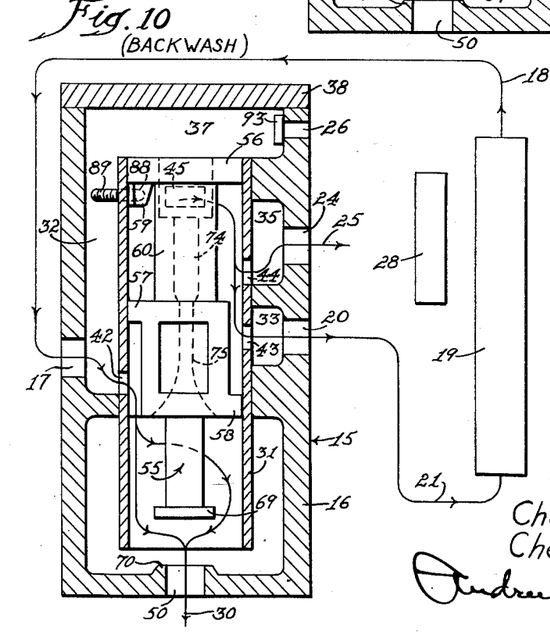

In operation, when the valve is in "Service" position, as shown in Fig. 9, raw water from a supply line 23 enters through the hole 22 (Fig. 3) and passes through the chamber 34 and the port 45 into the interior of the sleeve 31 above the plunger 55 which is then in its lowermost position. The raw water flows out of the upper end of sleeve 31, through chambers 37 and 32, hole 17 and pipe 18 into the top of the softener 19 in which it passes downwardly through a bed of base-exchanging material to the bottom of the softener 19. From the bottom of the softener the now softened water flows through pipe 21 into the hole 20, chamber 33, and port 43 into the interior of the sleeve 31 between the sealing and bearing surfaces 56 and 57 of the plunger 55 and around the neck 60. Thence, the soft water passes through the port 44, the chamber 35, and the hole 24 out to the service system through the pipe 25. It will also be noted that in this softening or "Service" position of the plunger 55, raw water may flow from the interior of the sleeve 31 through the port 88 provided the needle valve 89 is in position to leave the port 88 open. However, inasmuch as this flow will only augment the flow from the upper end of the sleeve 31 into the chamber 32 it is, therefore, harmless. Also, communication is established in this position of the valve between chamber 32 and bore 74 in plunger 55 through the port 42 and the passage 85. However, there can be no flow this way, because bore 74 leads to the radial holes 77 where fluid flow is stopped by the wall of the sleeve 31 above the port 44. The other end of the bore 74 leads into the bottom chamber of the valve body which is closed, the waste port 50 being closed by the drain shut-off valve 69.

When the plunger 55 is turned from "Service" position through approximately 90° in a clockwise direction, as viewed from the top, it is forced upwards by engagement of projection 66 on the sloping side of the notch 53 in ring 51 onto the cam surface or shoulder 52. It then occupies the position indicated in Fig. 10 which controls the "Backwash" operation of the softener. In this position of the plunger 55 the raw water under presure enters, as before, through the hole 22 and port 45, said last mentioned port 45 being now, however, below the top sealing and bearing surface 56. One branch of the flow is through the port 44, chamber 35, and hole 24 directly to the service system through pipe 25. In other words, hard water can be by-passed to service during the backwash period, if needed. The main flow, however, is through the port 43, chamber 33, hole 20, and pipe 21 to the bottom of the softener 19. The raw water passes through the bed of base-exchanging material in the softener from bottom to top, loosening up and cleansing the bed, and the waste water leaving the top of the softener passes through the pipe 18, hole 17, chamber 32, port 42, and port 50 to waste, through pipe 30, the drain valve 69 now being open. Obviously, in this backwash position of the valve, water can enter the central bore in the plunger 55 through its bottom end, but, since the passages 77 and 85 are both closed by the wall of the sleeve 31, the water is trapped in the bore. The needle valve port 88 is covered, in this position, by the extension bearing surface 59 which, however, may be omitted in certain cases since the small amount of water that would escape through said port 88 to waste would generally be considered insignificant.

Further turning of the plunger 55 from "Backwash" position through approximately 90° in the same direction mentioned above brings it to the position shown in Fig. 11 which is the "Brining" position. Hard water is by-passed to the service system in the same manner in this position as in the "Backwash" position. At the same time, raw water enters through the holes 77 which are located at a level below the top edge of the port 45 in the sleeve 31. From these holes 77, the raw water flows into the interior of the hollow stem 76 (Fig. 2) and down through the ejector nozzle 80 and bore 75 to waste through the port 50. The hollow stem 76 and the ejector nozzle 80 are not shown in any of the diagrammatic illustrations, Figs. 9–12. The jet discharged from the ejector nozzle 80 creates a suction in the bore 74 which communicates with the passage 85. Since this passage now communicates with the bottom of the softener 19 through the port 43, chamber 33, hole 20, and pipe 21, liquid will be drawn from the bottom of the softener 19 and discharged to drain together with the water forming the aforesaid jet. This liquid is first water, and later, spent brine, as will soon appear. The liquid thus taken out of the softener 19 is replaced by liquid drawn from the chamber 32 through hole 17 and pipe 18. The pull of gravity incident to removal of liquid from the bottom of tank 19 plus the suction in bore 74 which starts this flow to the drain helps to draw in the brine into the top of tank 19 from tank 28. The liquid drawn from the chamber 32 is obtained from two separate sources, as will now be explained: In turning the plunger 55 to the "Brining" position, Fig. 11, one of the screw heads 100 moves into register with the lug 101 of the lever 97, thus moving the end 99 of said lever 97 upwards and causing the valve 93 to be opened. In this way communication is established from the chamber 32 through the chamber 37, port 47 (Fig. 4), chamber 46, hole 26, and pipe 27 to the brine tank 28. Assuming that the brine tank 28 contains a saturated brine solution and that the needle valve 89 cooperating with port 88 is closed, the saturated brine solution will thus be drawn through the softener in the way just outlined. However, if the needle valve 89 is opened, raw water from inside the sleeve 31 will flow out through the port 88 and mix with the saturated brine solution from the brine tank. Hence, by adjusting the setting of the needle valve 89 the amount of water discharged through port 88 may be controlled and accordingly the dilution of the brine is controlled accurately. Since this water from port 88 is under pressure while the brine solution is not, only a relatively small maximum opening at 88 is required in order to enable the proportion of saturated brine solution in the outgoing mixture from the hole 17 to be adjusted anywhere practically from zero per cent of brine up to a hundred per cent of brine. It is important to note that there will be practically no change in the dilution of brine in the event of a change in water pressure, because the rate of flow of the brine depends upon the ejector action of nozzle 80, and that varies with change in water pressure, in the same way as the discharge of the diluting water through port 88 varies with changes in water pressure from the same source.

Figures 11, 12:
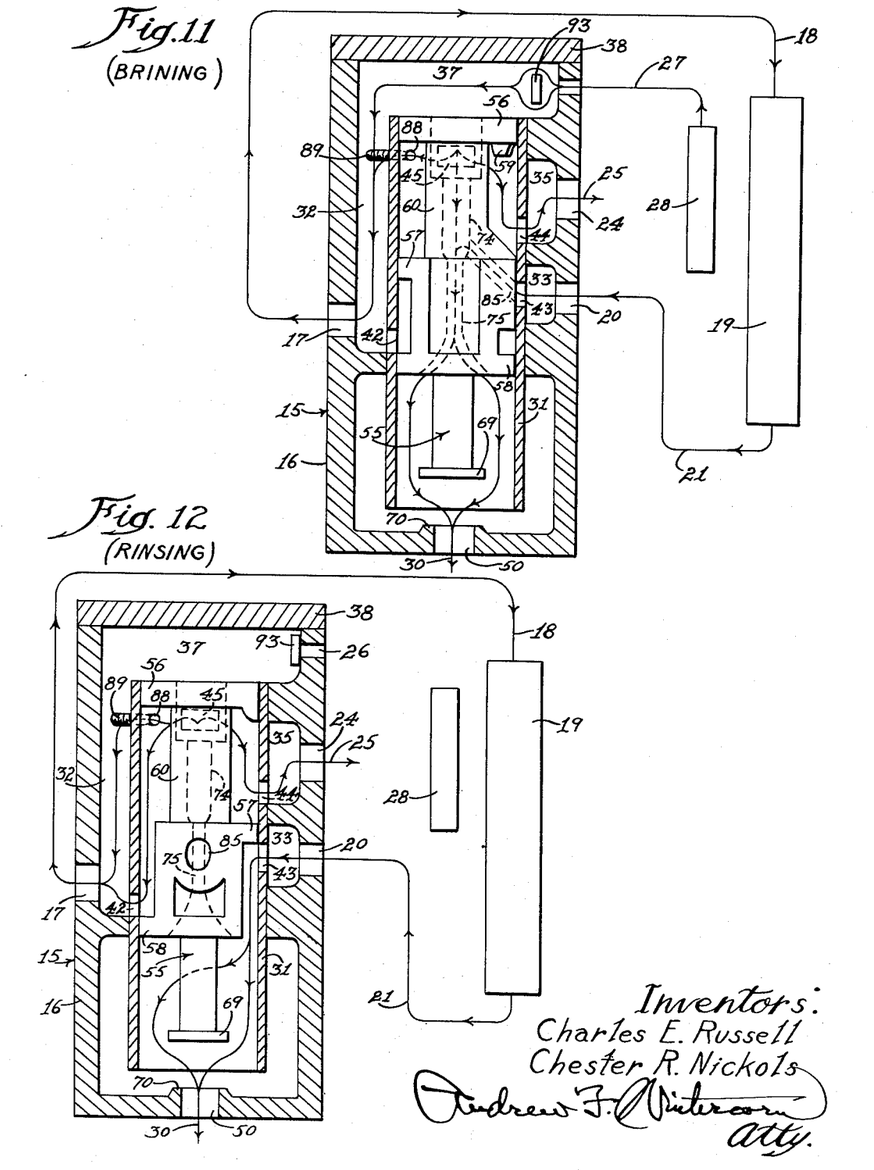

By turning the plunger 55 from "Brining" position through approximately another 90° in the same direction as before, it is caused to occupy the position shown in Fig. 12 which is the "Rinsing" position. Here, the raw water by-pass flow to the service pipe 25 is unchanged. The main flow, however, is from the port 45 through port 42, chamber 32, hole 17 and pipe 18 to the top of the softener 19 for rinsing flow downwardly through the bed of water softening material. From the bottom of the softener, the flow is through the pipe 21, hole 20, chamber 33, port 43, and port 50 to waste. Obviously, in this position, discharge of a small amount of water through the port 88 is harmless since a flow through said port merely parallels the main flow, as indicated. Any liquid entering the central bore of the plunger 55 at the bottom end is trapped in said bore, passage 85 and holes 77 being closed by the sleeve 31.

By turning the plunger 55 from "Rinse" position through another angle, less than 90°, in the same direction as before, the second screw head 100 on the top of the plunger 55 is brought into position under the lug 101 on the lever 97 whereby the brine valve 93 is again opened. This causes water in the chamber 32 to flow through chamber 37, port 47, chamber 46, hole 26, and pipe 27 to the brine tank 28, thus refilling said brine tank. The amount of refill water may be controlled either by shifting the valve from the "Refilling" position, or by means of a float valve 117 (Fig. 1) in the brine tank 28 in a manner well known in the art. Obviously, this "Refilling" position may be reached before or after complete closing of the "Rinsing" circuit, depending upon the angular position of the second screw head 100 relative to the first one previously mentioned in describing the "Brining" operation.

By further turning of the plunger 55 in the same direction as before, it will finally be returned to the "Service" position shown in Fig. 9. During this turning movement the flow to drain is gradually shut off by the plunger 55 so that when the poppet valve 69 approaches its seat the absence of flow prevents water hammering.

It will be noticed that, in the preceding explanation of the operation of the valve, the word "approximately" has been used consistently in connection with mentioning the angles through which the plunger 55 is to be turned. The reason for this will now be explained. Take, for example, the rotary movement of the plunger 55 from "Backwash" to "Brining" position, and consider the port 43. When leaving the "Backwash" position, the plunger 55 will gradually close the port 43, as the edge 118 (Fig. 7) proceeds over said port. Continued rotation of the plunger 55 will then gradually bring the outer end of the passage 85 into register with the port 43, thus causing the actual opening provided by the port 43 first to increase from zero to maximum and then to decrease from maximum to zero, as the plunger leaves the "Brining" position. Since this applies to one or more ports in each regenerating position of the plunger 55, it is obvious that by rotating the plunger through more or less than 90° between positions, the amount of flow can be controlled from zero to maximum in each of these positions. Consequently, with this valve it becomes readily feasible to provide two or more separate "Rinsing" positions, for example, instead of just one, as heretofore. Thus, there can be a first "Rinsing" position with a low flow rate, and a second "Rinsing," for flushing, position with a high flow rate. The determination of these several positions is accomplished by fixing the circumferential location of the stops 115 in the hand wheel 106. The hand wheel can then be turned until further rotation is prevented by one of the stops 115 hitting the side of the lever 108. To enable the hand wheel to be turned farther it is then necessary to move the lever 108 out of the way by pushing on the surface 111 so as to make the lever turn on the pin 109 against the resistance of spring 110. The rotation of the hand wheel 106 can then be continued until the next stop 115 hits the lever 108, and so forth.

Figures 5, 13, 14:
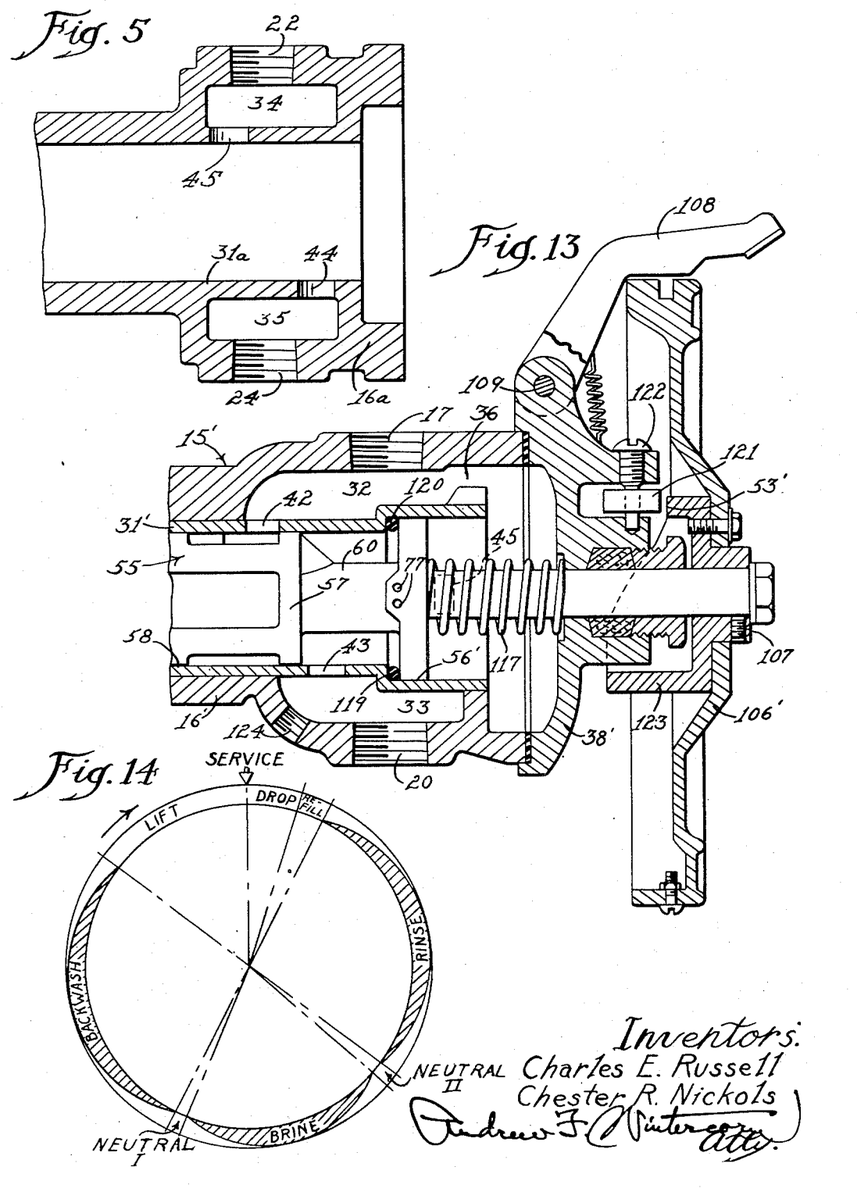
Fig. 5 is a fragmentary longitudinal section on line 5—5 of Fig. 3, but showing a slightly modified construction of the valve body.
Fig. 13 is a fragmentary longitudinal section of a modified or alternative construction of valve like that of Figs. 2–8 but incorporating the control cam and follower on the outside of the valve body and in the reverse relationship, the cam in this form being carried on the valve plunger and cooperating with a follower roller carried on the body.
Fig. 14 is an operation cycle diagram for the valve of Figs. 2–8.

Referring to Fig. 14 which is an operation cycle diagram for the valve, attention is called to the "Neutral" ranges, "Neutral 1" between "Backwash" and "Brine,"

and "Neutral 11" between "Brine" and "Rinse." In these two positions, the ports 43 and 42 are closed by the plunger 55, the surfaces 63 and 64 then facing said ports in such a position as to leave the mouth of the passage 85 out of register with the opening 43. The ports 44 and 45 are open and, consequently, raw water is by-passed to the service system. In the "Backwash" position of the valve, water under pressure is passed upwardly through the softener at a high flow rate, thereby unsettling and loosening up the zeolite bed. If, during the shifting of the valve from "Backwash" to "Brine" the movement is interrupted and the valve is allowed to remain for a moment in the "Neutral 1" position, the zeolite bed is afforded an opportunity to settle down before the brine solution is introduced in a downward direction. The "Neutral 11" position has a different purpose. Its principal use is in connection with softeners designed for so-called internal salting, namely, softeners which have no brine tank, and in which brining, or salting, is accomplished by removing a cap on the softener and introducing a quantity of salt through the uncovered opening to the top of the zeolite bed. In this case, the regeneration procedure is as follows: Backwashing is performed in the way described above, whereupon the valve is shifted to "Brining" position. With this kind of softener the port 88 in the valve is permanently closed and, since there is no brine tank, the opening 26 is also plugged. Consequently, the suction created by the ejector jet and transmitted to the bottom of the softener, as described above, can only have the effect of creating a partial vacuum in the system since there is no way of replacing the liquid that would otherwise be drawn out of the softener. Now, if the aforementioned cap on top of the softener is removed, liquid is drawn from the softener and replaced by air taken in through the uncovered opening in the softener. Thus, the water level in the softener tank is gradually lowered. When this lowering of the water level has proceeded to a predetermined extent, the valve is shifted to the "Neutral 11" position in which all flow is interrupted except the by-passing of raw water to the service system. The salt is introduced through the opening in the softener, the cap replaced, and the valve shifted to a "Rinsing" position where the salt is washed down through the zeolite bed until the supply of salt is exhausted, after which the rinsing proper continues until the valve is again shifted to "Service." Of course, the rinsing operation may be divided into two or more phases, such as slow rinse and flushing out, as desired. This one design of valve is therefore suitable for softeners that are regenerated by internal salting as well as for softeners equipped with brine tanks. When this valve is used on rental softeners, the service man can attend to the backwash operation and pour in the salt and then leave the operation of the valve from that point on to an automatic mechanism to move it through the slow rinse and fast or flushing rinse positions back to the service position. Various mechanisms have been proposed that are satisfactory for turning the valve continuously through these portions of the cycle, and through the entire cycle, for that matter, assuming the softener is equipped with a brine tank. The diagram indicates by its radial depth of the cross-hatched portions the extent of port opening, the port opening starting from zero and reaching a maximum at the midpoint of each of the three ranges for backwashing, brining, and rinsing, and thereafter gradually diminishing again to a zero opening at the end.

By unscrewing the plug 83 from the end of the hollow stem 76, the spring 81 and the ejector nozzle 80 are made freely accessible from the outside of the valve. Said parts may thus be lifted out of the stem or they, together with the entire bore of the stem, may be cleaned by placing the plunger 55 in an angular position—"Service"—where water under pressure will flow through said bore and out through the open end of the stem 76.

Particularly in large size valves, or when working with high water pressure, it is preferable to arrange so that, in moving from "Service" position, the port 45 is closed exactly at the moment when the pin 71 comes in contact with the plunger surface below it so as to cause the drain valve 69 to be opened by any further movement upwardly of the plunger. By this coordination of operations, the valve 69 is assured of operating correctly and water hammering is avoided. In "Service" position, water under pressure has access to the space above the plunger 55 through the port 45 and to the space below the plunger through the port 42 and the passages within the plunger. At the moment when the port 45 is closed, both of these spaces are shut off from communication with the source of water pressure and, consequently, the plunger 55 is still practically balanced. Any further movement upwardly of the plunger 55 will open the drain valve 69 and establish communication between the two aforementioned spaces through the port 42.

It will be noted that the drain valve 69 and the brine valve 93 are positively pressed against their seats both by a spring and by the water pressure acting on the valves when the plunger 55 is in "Service" position. Thus no leakage of water to waste or to the brine tank during the "Service" period is possible.

Due to their nature, the three sealing and bearing surfaces 56, 57 and 58 do not normally provide a positive seal. For practical and manufacturing reasons a slight clearance between those surfaces and the interior surface of the sleeve 31 is necessary which, under certain pressure conditions, may cause a slight leakage past said surfaces. However, as far as the sealing and bearing surfaces 57 and 58 are concerned, slight leakage there is of no consequence since it only means that an insignificant amount of raw water escapes to waste during the regeneration period when the drain valve 69 is open. As regards the sealing and bearing surface 56, conditions may be different. During the regeneration period the water pressure below this sealing and bearing surface is higher than, or equal to, the water pressure above said surface. Any leakage past the sealing and bearing surface 56 would therefore, occur towards the chamber 37 during the regeneration cycle. In the "Backwash" position, this would mean leakage to waste through the port 42 which would be of no consequence. During the "Brining" period it would mean leakage of raw water into the flow of brine solution which could be only slightly harmful only in case a completely saturated brine solution was required, but that is very seldom true. During the "Rinsing" operation, leakage past said sealing and bearing surface 56 would only parallel the normal flow and, consequently, be entirely harmless. During the "Service" period, the raw water pressure is above the sealing and bearing surface 56 and any leakage past said surface downwardly would mean that raw water would be supplied to the flow of softened water into the service system. In the large majority of cases this is not objectionable so long as the amount of leakage is small. In other cases it cannot be allowed. Thus it is obvious that in a large majority of cases the embodiment of the valve described above is entirely satisfactory with regard to its sealing properties, besides being extremely simple to manufacture and operate and having a minimum of movable parts. In the relatively few cases where it is imperative that no trace of hard water enters the service system in the "Service" position of the valve, the modified embodiment shown at 15' in Fig. 13 may be employed.

In this diagrammatic illustration, Fig. 13, only the top parts of the body 16', sleeve 31', and plunger 55' are shown, together with a modified embodiment of the operating mechanism. The sleeve 31' is provided with a circumferential shoulder 119 on which a sealing ring 120 of resilient material is secured. The diameter of the sealing surface 56' is increased to fit the larger bore in the top portion of the sleeve 31'. It is obvious that this modification provides a positive seal between the raw water inlet port 45 and the port 43 leading to the service system. It is also obvious that this seal feature 119—120 may be used in a valve that is otherwise of the design of Figs. 2 to 4 and 6 to 8.

In this modification of the valve (Fig. 13) the internal cam mechanism 51—53 and follower 66 of Figs. 2–8 is replaced by an external cam mechanism. A roller 121 rotatably mounted on a pin 122 is provided on top of the cover 38' for cooperation with a circular cam 123 provided on the bottom side of the hand wheel 106', said cam 123 being provided with a notch 53' similar to the notch 53 in the embodiment of the invention previously described. Obviously, the external cam and follower mechanism just described could be substituted for the internal cam and follower mechanism shown in Figs. 2 to 8.

Figure 15:
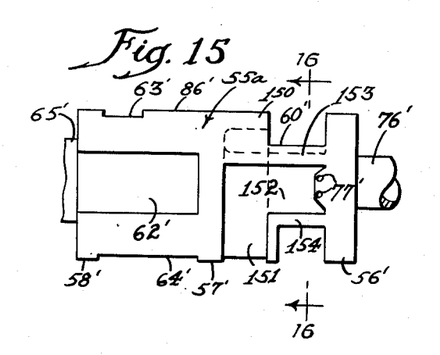
Fig. 15 is a side view of another valve plunger of modified or alternative construction designed for use in a valve of the kind shown in Fig. 17, which is of the same type as that of Figs. 2–8 but is so designed that it will not permit bypassing of hard water to service during regeneration.
Figure 16:
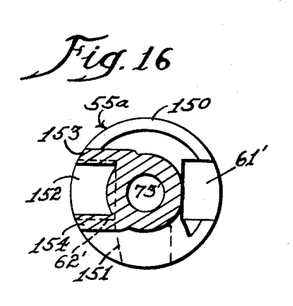
Fig. 16 is a section on the line 16—16 of Fig. 15.
Figure 17:
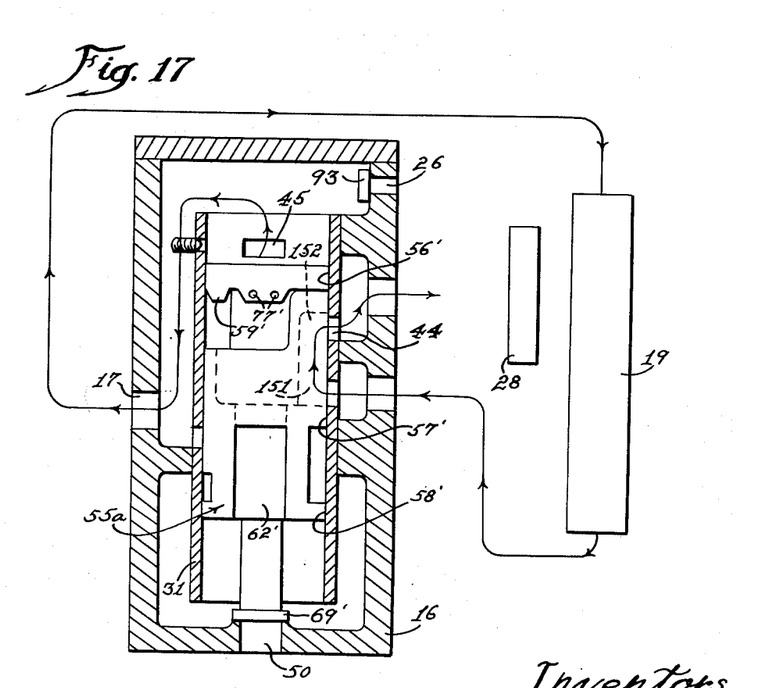
Fig. 17 is a flow diagram for "Service," similar to Fig. 9, but showing the modified or alternative form of valve using the valve plunger of Figs. 15 and 16.

The modified form of valve shown in Figs. 15 and 16, and illustrated diagrammatically in Fig. 17 is designed to take care of the case where by-passing of raw water to service cannot be allowed at any time, as in many industrial installations. In this modification the only change as compared to the embodiment of Fig. 2 relates to the plunger 55a. The sealing and bearing surface 57' is provided with an extension upwards 150 which runs unbroken around the periphery, except for an upwards extension of the recess 61' and a passage 151. This passage 151 communicates with a longitudinal passage 152 extending to the sealing and bearing surface 56' and defined sideways between longitudinal sealing and bearing surfaces 153, 154. Otherwise the plunger 55a is substantially the same as plunger 55. In Fig. 17 the passage 152 is shown communicating with the port 44 to illustrate the flow circuit. The operation of this modified valve is identical with that described with reference to Figs. 9 to 12, with the single exception that the raw water supply is shut off from the port 44 in all positions of the plunger.

In still another modification shown in Fig. 5, the previously mentioned cylindrical sleeve 31 is eliminated and made an integral part of the body 16a, as shown by wall 31a. The main objection against this embodiment is that it makes the body casting more complicated and, hence, more expensive to manufacture.

Referring back to Figs. 2 to 4 and 6 to 8 and also Fig. 9 illustrating the flow in "Service," the hole 124 communicating with chamber 33 is adapted to receive a sampling cock from which water may be drawn at any time during "Service" operation to check for hardness, and also to check the water at the end of the "Rinse" flow for salt taste and softness, where it is up to the operator to shift the valve to the "Service" position when the "Rinse" flow has been completed.

It is believed the foregoing description conveys a good understanding of the objects and advantages of our invention. The appended claims have been drawn to cover all legitimate modifications and adaptations.

We claim:

1. A valve structure, comprising a body having an elongated bore therein and having a port provided therein at one end of the bore, and more than two substantially radial ports provided therein in endwise and circumferentially spaced relation relative to and communicating with the bore, an elongated valve plunger controlling communication between said radial ports and between said radial ports and said end port in a plurality of different positions of endwise and rotary movement and having for that purpose projecting from its periphery a plurality of generally cylindrical bearing portions in coaxially spaced relation fitting closely but slidably and rotatably in said bore, spring means normally urging said plunger toward the ported end of said bore, means for transmitting rotation as well as endwise movement to said plunger toward the other end of said bore against the action of said spring means, and a poppet type shut-off valve for closing said end port carried on the adjoining end of said plunger.

2. A valve structure as set forth in claim 1, wherein said poppet valve is slidably mounted for endwise movement substantially coaxially relative to said plunger, said structure including spring means for normally urging said poppet valve outwardly from said plunger toward said end port so that said plunger is free to move endwise relative to said poppet valve while the latter is seated, and means positively limiting outward movement of said poppet valve relative to said plunger so that said poppet valve can be unseated by endwise movement of said plunger away from said end port.

3. A valve structure, comprising a body having an elongated bore therein and having a port provided therein at one end of the bore, and more than two substantially radial ports provided therein in endwise and circumferentially spaced relation relative to and communicating with the bore, an elongated valve plunger controlling communication between said radial ports and between said radial ports and said end port in a plurality of different positions of endwise and rotary movement and having for that purpose projecting from its periphery a plurality of generally cylindrical bearing portions in coaxially spaced relation fitting closely but slidably and rotatably in said bore, spring means normally urging said plunger toward the ported end of said bore, cooperating cam and follower means on said body and plunger held engaged under the pressure of said spring means predetermining a single operative position of said plunger in respect to its endwise and rotary movement adjacent the end port to establish one system of communication for fluid flow between said radial ports and predetermining a raised position of said plunger in removed relation to said end port, wherein the plunger is adapted to be turned to any one of a plurality of operative positions, each establishing a different system of communication for fluid flow between said radial ports, each such system including said end port, means for turning said plunger adapted to permit endwise movement thereof, and a poppet type shut-off valve for closing said end port carried on the adjoining end of said plunger.

4. A valve structure as set forth in claim 3, wherein said poppet valve is slidably mounted for endwise movement substantially coaxially relative to said plunger, said structure including spring means for normally urging said poppet valve outwardly from said plunger toward said end port so that said plunger is free to move endwise relative to said poppet valve while the latter is seated, and means positively limiting outward movement of said poppet valve relative to said plunger so that said poppet valve can be unseated by raising said plunger, said means further preventing seating of said poppet valve in the raised position of said plunger.

5. A valve structure, comprising a body having an elongated bore therein and having a port provided therein at one end of the bore, and more than two substantially radial ports provided therein in endwise and circumferentially spaced relation relative to and communicating with the bore, an elongated valve plunger controlling communication between said radial ports and between said radial ports and said end port in a plurality of different positions of endwise and rotary movement and having for that purpose projecting from its periphery a plurality of generally cylindrical bearing portions in coaxially spaced relation fitting closely but slidably and rotatably in said bore, spring means normally urging said plunger toward the ported end of said bore, means for transmitting rotation as well as endwise movement to said plunger toward the other end of said bore against the action of said spring means, a poppet type shut-off valve for closing said end port carried on the adjoining end of said plunger, said plunger having a longitudinal bore provided therein the discharge end of which is in that end of said plunger carrying said poppet valve, said plunger having a radial port provided therein communicating with the other end of said longitudinal bore for delivery of liquid under pressure thereto when the radial port in said plunger communicates with one of the radial ports in said body, and an ejector nozzle discharging such liquid through said plunger bore toward the end port, said plunger having another radial port provided therein which is arranged to register with another of said radial ports in said body and communicates with said longitudinal bore adjacent and in radially spaced relation to the discharge end of said nozzle.

6. A valve structure, comprising a body having an elongated bore therein and having a port provided therein at one end of the bore, and more than two substantially radial ports provided therein in endwise and circumferentially spaced relation relative to and communicating with the bore, an elongated valve plunger controlling communication between said radial ports and between said radial ports and said end port in a plurality of different positions of endwise and rotary movement and having for that purpose projecting from its periphery a plurality of generally cylindrical bearing portions in coaxially spaced relation fitting closely but slidably and rotatably in said bore, spring means normally urging said plunger toward the ported end of said bore, cooperating cam and follower means on said body and plunger held engaged under the pressure of said spring means predetermining a single operative position of said plunger in respect to its endwise and rotary movement adjacent the end port to establish one system of communication for fluid flow between said radial ports and predetermining a raised position of said plunger in removed relation to said end port, wherein the plunger is adapted to be turned to any one of a plurality of operative positions, each establishing a different system of communication for fluid flow between said radial ports, each such system including said end port, means for turning said plunger adapted to permit endwise movement thereof, a poppet type shut-off valve for closing said end port carried on the adjoining end of said plunger, said plunger having a longitudinal bore provided therein the discharge end of which is in that end of said plunger carrying said poppet valve, said plunger having a radial port provided therein communicating with the other end of said longitudinal bore for delivery of liquid under pressure thereto when the radial port in said plunger communicates with one of the radial ports in said body, and an ejector nozzle discharging such liquid through said plunger bore toward the end port, said plunger having another radial port provided therein which is arranged to register with another of said radial ports in said body and communicates with said longitudinal bore adjacent and in radially spaced relation to the discharge end of said nozzle.

7. A valve structure, comprising a body having an elongated bore therein and having a port provided therein at one end of the bore, and a plurality of substantially radial ports provided therein in endwise and circumferentially spaced relation relative to and communicating with the bore, an elongated valve plunger conformed on the periphery for fitting closely but slidably and rotatably in said bore and for providing different systems of communication between said ports in different positions of rotary and endwise movement, spring means normally urging said plunger toward the ported end of said bore, means for transmitting rotation as well as endwise movement to said plunger toward the other end of said bore against the action of said spring means, a poppet type shut-off valve for closing said end port carried on the adjoining end of said plunger, said body having a second end port provided therein at the opposite end from the first end port and when open communicating with the other ports by way of said plunger, a spring-pressed poppet type shut-off valve for closing the second end port, and means operated in a given movement of the plunger to open the latter valve.

8. A valve structure, comprising a body having an elongated bore therein and having a port provided therein at one end of the bore, and a plurality of substantially radial ports provided therein in endwise and circumferentially spaced relation relative to and communicating with the bore, an elongated valve plunger conformed on the periphery for fitting closely but slidably and rotatably in said bore and for providing different systems of communication between said ports in different positions of rotary and endwise movement, spring means normally urging said plunger toward the ported end of said bore, cooperating cam and follower means on said body and plunger held engaged under the pressure of said spring means predetermining a single operative position of said plunger in respect to its endwise and rotary movement adjacent the end port to establish one system of communication for fluid flow between said radial ports and predetermining a raised position of said plunger in removed relation to said end port, wherein the plunger is adapted to be turned to any one of a plurality of operative positions, each establishing a different system of communication for fluid flow between said radial ports, each such system including said end port, means for turning said plunger adapted to permit endwise movement thereof, a poppet type shut-off valve for closing said end port carried on the adjoining end of said plunger, said body having a second end port provided therein at the opposite end from the first end port and when open communicating with the other ports by way of said plunger, a spring-pressed poppet type shut-off valve for closing the second end port, and means whereby the latter valve is opened only in a certain position of rotation of said plunger in its raised position.

9. A valve structure, comprising a body having an elongated bore therein and having a port provided therein at one end of the bore, and a plurality of substantially radial ports provided therein in endwise and circumferentially spaced relation relative to and communicating with the bore, an elongated valve plunger conformed on the periphery for fitting closely but slidably and rotatably in said bore and for providing different systems of communication between said ports in different positions of rotary and endwise movement, spring means normally urging said plunger toward the ported end of said bore, cooperating cam and follower means on said body and plunger held engaged under the pressure of said spring means predetermining a single operative position of said plunger in respect to its endwise and rotary movement adjacent the end port to establish one system of communication for fluid flow between said radial ports and predetermining a raised position of said plunger in removed relation to said end port, wherein the plunger is adapted to be turned to any one of a plurality of operative positions, each establishing a different system of communication for fluid flow between said radial ports, each such system including said end port, means for turning said plunger adapted to permit endwise movement thereof, a poppet type shut-off valve for closing said end port carried on the adjoining end of said plunger, said body having a second end port provided therein at the opposite end from the first end port and when open communicating with the other ports by way of said plunger, a spring-pressed poppet type shut-off valve for closing the second end port, and means whereby the latter valve is opened only in two angular positions of rotation of said plunger in its raised position.

10. A valve structure, comprising a body having an elongated bore therein and having a port provided therein at one end of the bore, and a plurality of substantially radial ports provided therein in endwise and circumferentially spaced relation relative to and communicating with the bore, an elongated valve plunger conformed on the periphery for fitting closely but slidably and rotatably in said bore and for providing different systems of communication between said ports in different positions of rotary and endwise movement, spring means normally urging said plunger toward the ported end of said bore, means for transmitting rotation as well as endwise movement to said plunger toward the other end of said bore against the action of said spring means, a poppet type shut-off valve for closing said end port carried on the adjoining end of said plunger, said body having an elongated passage provided therein communicating at one end with the end of said bore at the opposite end from the end port and at the other end with one of the radial ports, said body having a small radial port provided therein communicating with the passage intermediate its ends, a manually adjustable valve for regulating flow through the small radial port, said body having a second end port leading into the same end of the bore as said passage and when open communicating with the other ports by way of said plunger, a spring-pressed poppet type shut-off valve for closing the second end port, and means operated in movement of the plunger to open the latter valve.

11. A valve structure, comprising a body having an elongated bore therein and having a port provided therein at one end of the bore, and a plurality of substantially radial ports provided therein in endwise and circumferentially spaced relation relative to and communicating with the bore, an elongated valve plunger conformed on the periphery for fitting closely but slidably and rotatably in said bore and for providing different systems of communication between said ports in different positions of rotary and endwise movement, spring means normally urging said plunger toward the ported end of said bore, cooperating cam and follower means on said body and plunger held engaged under the pressure of said spring means predetermining a single operative position of said plunger in respect to its endwise and rotary movement adjacent the end port to establish one system of communication for fluid flow between said radial ports and predetermining a raised position of said plunger in removed relation to said end port, wherein the plunger is adapted to be turned to any one of a plurality of operative positions, each establishing a different system of communication for fluid flow between said radial ports, means for turning said plunger adapted to permit endwise movement thereof, each such system including said end port, a poppet type shut-off valve for closing said end port carried on the adjoining end of said plunger, said body having an elongated passage provided therein communicating at one end with the end of said bore at the opposite end from the end port and at the other end with one of the radial ports, said body having a small radial port provided therein communicating with the passage intermediate its ends, a manually adjustable valve for regulating flow through the small radial port, said body having a second end port leading into the same end of the bore as said passage and when open communicating with the other ports by way of said plunger, a spring-pressed poppet type shut-off valve for closing the second end port, and means whereby the latter valve is opened only in a certain position of rotation of said plunger in its raised position.

12. A valve structure, comprising a body having an elongated bore therein and having a port provided therein at one end of the bore, and four radial ports provided therein in endwise and circumferentially spaced relation relative to and communicating with the bore, an elongated valve plunger of generally cylindrical form having three coaxially spaced cylindrical bearing portions whereby the plunger fits closely but slidably and rotatably in said bore, means for transmitting rotation as well as endwise movement to said plunger, the three cylindrical bearing portions being spaced in a predetermined relation to the endwise spacing of the radial ports in the body, and said plunger being conformed peripherally between said bearing portions in relation to the angular spacing of said ports, whereby said plunger functions as a plunger type valve with respect thereto in a plurality of different positions of endwise and rotary movement, and a poppet type shut-off valve for closing said end port carried on the adjoining end of said plunger.

13. A valve structure as set forth in claim 12, wherein said poppet valve is slidably mounted for endwise movement substantially coaxially relative to said plunger, said structure including spring means for normally urging said poppet valve outwardly from said plunger toward said end port, and means positively limiting outward movement of said poppet valve.

14. A valve structure, comprising a body having an elongated bore therein and having a port provided therein at one end of the bore, and four radial ports provided therein in endwise and circumferentially spaced relation relative to and communicating with the bore, an elongated valve plunger of generally cylindrical form having three coaxially spaced cylindrical bearing portions whereby the plunger fits closely but slidably and rotatably in said bore, cooperating cam and follower means on said body and plunger predetermining a single operative position of said plunger in respect to its endwise and rotary movement adjacent the end port, to establish one system of communication for fluid flow between three of the radial ports, and predetermining a raised position of said plunger in removed relation to said end port, wherein the plunger is adapted to be turned to any one of a plurality of operative positions, each establishing a different system of communication for fluid flow between said radial ports, each such system including said end port, means for turning said plunger adapted to permit endwise movement thereof, the three cylindrical bearing portions being spaced in a predetermined relation to the endwise spacing of the radial ports in the body, and said plunger being conformed peripherally between said bearing portions in relation to the angular spacing of said ports, whereby said plunger functions as a plunger type valve with respect thereto in a plurality of different positions of endwise and rotary movement, and a poppet type shut-off valve for closing said end port carried on the adjoining end of said plunger.

15. A valve structure, comprising a body having an elongated bore therein and having a port provided therein at one end of the bore, and four radial ports provided therein in endwise and circumferentially spaced relation relative to and communicating with the bore, an elongated valve plunger of generally cylindrical form having three coaxially spaced cylindrical bearing portions whereby the plunger fits closely but slidably and rotatably in said bore, means for transmitting rotation as well as endwise movement to said plunger, the three cylindrical bearing portions being spaced in a predetermined relation to the endwise spacing of the radial ports in the body, and said plunger being conformed peripherally between said bearing portions in relation to the angular spacing of said ports, whereby said plunger functions as a plunger type valve with respect thereto in a plurality of different positions of endwise and rotary movement, a poppet type shut-off valve for closing said end port carried on the adjoining end of said plunger, said body having an elongated passage provided therein communicating at one end with the end of said bore at the opposite end from the end port and at the other end with one of the radial ports, said body having another radial port provided therein communicating with the passage intermediate its ends, a manually adjustable valve for regulating flow through the last mentioned radial port, said body having still another port leading into the same end of the bore as said passage, a spring-pressed poppet type shut-off valve for closing the second end port, and means operated in movement of the plunger to open the latter valve.

16. A multiple valve, comprising a body provided with a longitudinal cylindrical bore, ports opening from said bore, means for connecting pipes with said ports, one of said ports being an end port, a plunger reciprocably and rotatably mounted in said bore and conformed on the periphery to provide predetermined passages between the bore and said plunger valve member operating therein for different systems of communication between said ports in different predetermined positions of rotary and endwise movement of said plunger, means for rotating said plunger, means for automatically reciprocating said plunger during parts of its rotating movement, and a poppet type valve slidably and rotatably mounted on the end of said plunger in coaxial relationship thereto for cooperation with said end port in a certain position of endwise movement of the plunger, said plunger having a longitudinal bore provided therein, said bore being open at one end towards the aforesaid end port, a passage leading from the other end of said bore to the periphery of the plunger, another passage leading from the bore to the periphery of the plunger intermediate said first-mentioned passage and said open end of the bore, an ejector nozzle in said bore arranged to discharge fluid from said first passage toward the open end of the bore and having its discharge end disposed close to the inner end of the intermediate passage, an operating stem on that end of said plunger remote from the open end of the bore and extending to the outside of the valve body, said bore in the plunger having an extension extending through said stem, and means for closing the outer end of said extension of the bore, so as to permit removal of the ejector nozzle from outside the valve and cleaning of the plunger bore and its extension.

17. A multiple valve, comprising a body provided with a longitudinal cylindrical bore, ports opening from said bore, means for connecting pipes with said ports, one of said ports being an end port, a plunger reciprocably and rotatably mounted in said bore and conformed on the periphery to provide predetermined passages between the bore and said plunger valve member operating therein for different systems of communication between said ports in different predetermined positions of rotary and endwise movement of said plunger, means for rotating said plunger, stop means for interrupting said rotary movement of the plunger, means for releasing said stop means, means for adjusting said stop means circumferentially relative to said plunger to regulate the degree of opening of the plunger controlled ports, means for automatically reciprocating said plunger during part of its rotary movement, and a poppet type valve slidably and rotatably mounted on the end of said plunger in coaxial relationship thereto for cooperation with said end port in a certain position of endwise movement of the plunger, said plunger having a longitudinal bore provided therein, said bore being open at one end towards the aforesaid end port, a passage leading from the other end of said bore to the periphery of the plunger, another passage leading from the bore to the periphery of the plunger intermediate said first-mentioned passage and said open end of the bore, an ejector nozzle in said bore arranged to discharge fluid from said first passage toward the open end of the bore and having its discharge end disposed close to the inner end of the intermediate passage, an operating stem on that end of said plunger remote from the open end of the bore and extending to the outside of the valve body, said bore in the plunger having an extension extending through said stem, and means for closing the outer end of said extension of the bore, so as to permit removal of the ejector nozzle from outside the valve and cleaning of the plunger bore and its extension.

18. A multiple valve comprising a body provided with a longitudinal cylindrical bore, ports opening from said bore, means for connecting pipes with said ports, one of said ports being an end port, a plunger reciprocably and rotatably mounted in said bore and conformed on the periphery to provide different systems of communication between said ports in different positions of endwise and rotary movement, means for rotating said plunger, stop means for interrupting said rotary movement of the plunger, means for releasing said stop means, means for adjusting said stop means in a circumferential direction relative to said plunger to regulate the degree of opening of the plunger controlled ports, means for automatically reciprocating said plunger during part of its rotary movement, a poppet type valve rotatably mounted on the end of said plunger for cooperation with said end port, a second end port communicating with the other end of said cylindrical bore, a valve for opening and closing said second end port, and means for operating the latter valve automatically by the movement of the plunger.

19. A multiple valve, comprising a body provided with a longitudinal cylindrical bore, ports opening from said bore, means for connecting pipes with said ports, one of said ports being an end port, a plunger reciprocably and rotatably mounted in said bore and conformed on the periphery to provide different systems of communication between said ports in different positions of endwise and rotary movement, means for rotating said plunger, means for automatically reciprocating said plunger during part of its rotary movement, a poppet type valve mounted on the end of said plunger for cooperation with the end port, a second end port communicating with the other end of said cylindrical bore, a valve for opening and closing said second end port, means for operating the latter valve automatically in a given movement of the plunger, said plunger having a longitudinal bore provided therein, said bore being open towards the first-mentioned end port, a passage leading from said plunger bore to the periphery of the plunger, another passage leading from the bore to the periphery of the plunger intermediate said first-mentioned passage and said open end of the bore, an ejector nozzle in said plunger bore communicating with the first passage and arranged to discharge toward the first mentioned end port and having its discharge end close to the inner end of said intermediate passage, a hollow stem on that end of said plunger remote from the poppet valve extending from said body for connection with the means for rotating said plunger, said stem having a bore forming an extension of the plunger bore, and means for closing the outer end of said extension of the bore, so as to permit removal of the ejector nozzle from outside the valve and cleaning of the plunger bore and its extension.

20. A multiple valve as set forth in claim 19 having a passage in said body connecting said second end port with one of the pipe connections, a port providing communication between said passage and the cylindrical bore in the body, a valve for regulating flow through said last-mentioned port, and means for operating said valve manually from the outside of the body.

21. A multiple valve comprising a body provided with a longitudinal cylindrical bore, ports opening from said bore, means for connecting pipes with said ports, one of said ports being an end port, a plunger reciprocably and rotatably mounted in said bore to provide different systems of communication between said ports, means for rotating said plunger, means for automatically reciprocating said plunger during part of its rotary movement, a poppet type valve slidably and rotatably mounted on the end of said plunger for cooperation with said end port, spring means urging said poppet valve away from the plunger, stop means limiting said movement relative to the plunger, a second end port communicating with the other end of said cylindrical bore, a valve for opening and closing said second end port, means for operating the latter valve automatically by the movement of the plunger, a passage in said body connecting said second end port with one of the pipe connections, a port providing communication between said passage and the cylindrical bore in the body, a valve for controlling said last-mentioned port, and means for operating said valve manually from the outside of the body.

22. A multiple valve comprising a body provided with a longitudinal cylindrical bore, ports opening from said bore, means for connecting pipes with said ports, one of said ports being an end port, and another port being an inlet port for fluid under pressure, a plunger reciprocably and rotatably mounted in said bore and conformed on the periphery to provide different systems of communication between said ports in different positions of endwise and rotary movement, means for operating said plunger, a poppet type valve slidably and rotatably mounted on the end of said plunger for cooperation with said end port, spring means adapted to urge said poppet valve away from the plunger, and stop means adapted to limit said movement relative to said plunger so that said poppet valve can be unseated by endwise movement of said plunger away from said end port, the action of said stop means being so coordinated with the closing of the pressure inlet port by reciprocation of said plunger as to cause the valve for the end port to open at the moment when the pressure inlet port is completely closed.

23. A multiple valve comprising a body provided with a longitudinal cylindrical bore, ports opening from said bore, means for connecting pipes with said ports, one of said ports being an end port and another port being an inlet port for fluid under pressure, a plunger reciprocably and rotatably mounted in said bore and conformed on the periphery to provide different systems of communication between said ports in different positions of endwise and rotary movement, means for rotating said plunger, means for automatically reciprocating said plunger during part of its rotary movement, a poppet type valve rotatably and slidably mounted on the end of said plunger for cooperation with the end port, spring means urging said poppet valve away from the plunger, stop means limiting said movement relative to the plunger, the action of said stop means being so coordinated with the closing of the pressure inlet port by movement of the plunger as to cause the valve for the end port to open at the moment when the pressure inlet port is completely closed, a second end port communicating with the other end of said cylindrical bore, a valve for opening and closing said second end port, means for operating the latter valve automatically in a given movement of the plunger, said plunger having a longitudinal bore provided therein, said bore being open toward the first-mentioned end port, a passage leading from said plunger bore to the periphery of the plunger, another passage leading from the bore to the periphery of the plunger intermediate said first-mentioned passage and said open end of the bore, an ejector nozzle in said plunger bore communicating with the first passage and arranged to discharge toward the first-mentioned end port and having its discharge end close to the inner end of said intermediate passage, a hollow stem on that end of said plunger remote from the poppet valve extending from said body for connection with the means for rotating said plunger, said stem having a bore forming an extension of the plunger bore, and means for closing the outer end of said extension of the bore so as to permit removal of the ejector nozzle from outside the valve and cleaning of the plunger bore and its extension.

24. In a multiple valve structure, a hollow body provided with an elongated cylindrical bore, and more than two radial ports opening from said bore, and a port opening from one end of said bore as an axial extension thereof, a plunger valve member of generally cylindrical form reciprocable and rotatable in said bore and conformed on the periphery to serve as the sole means of providing predetermined passages between the bore and said plunger valve member operating therein for different systems of communication between said radial ports and end port in different predetermined positions of rotary and endwise movement of said plunger valve member, means for giving the plunger valve member reciprocatory and rotary movement to different predetermined operative positions, and another valve extending axially from the plunger valve member and operable axially relative to said end port by endwise movement of the plunger valve member to open and close the end port.

25. In a multiple valve structure, a hollow body provided with an elongated cylindrical bore, and radial ports opening from said bore, and an end port opening from one end of said bore as an axial extension thereof, a plunger valve member of generally cylindrical form reciprocable and rotatable in said bore and conformed on the periphery to serve as the sole means of providing predetermined passages between the bore and said plunger valve member operating therein for different systems of communication between said radial ports and end port in different predetermined positions of rotary and endwise movement of said plunger valve member, means for giving the plunger valve member reciprocatory and rotary movement to different predetermined operative positions, another valve extending axially from the plunger valve member and operable axially relative to said end port by endwise movement of the plunger valve member to open and close the end port, said body having a second end port communicating with the other end of said bore, another valve for opening and closing the second end port, and means for operating the latter valve in the movement of the plunger valve member to a predetermined position.

26. In a multiple valve structure, a hollow body provided with an elongated cylindrical bore, and radial ports opening from said bore, and an end port opening from one end of said bore as an axial extension thereof, a plunger valve member of generally cylindrical form reciprocable and rotatable in said bore and conformed on the periphery to serve as the sole means of providing predetermined passages between the bore and said plunger valve member operating therein for different systems of communication between said radial ports and end port in different predetermined positions of rotary and endwise movement of said plunger valve member, means for giving the plunger valve member reciprocatory and rotary movement to different predetermined operative positions, another valve extending axially from the plunger valve member and operable axially relative to said end port by endwise movement of the plunger valve member to open and close the end port, said body having a second end port communicating with the other end of said bore, another valve for opening and closing the second end port, and means for operating the latter valve in the movement of the plunger valve member to either of two predetermined positions.

27. A multiple valve, comprising a body provided with a longitudinal cylindrical bore, ports opening from said bore, means for connecting pipes with said ports, one of said ports being an end port, a plunger reciprocable and rotatably mounted in said bore and conformed on the periphery to provide predetermined passages between the bore and said plunger valve member operating therein for different systems of communication between said ports in different predetermined positions of rotary and endwise movement of said plunger, means for rotating said plunger, means for automatically causing endwise movement of said plunger during parts of its rotating movement, and a poppet type valve slidably and rotatably mounted on the end of said plunger in coaxial relationship thereto for cooperation with said end port in a certain position of endwise movement of the plunger.

28. A multiple valve, comprising a body provided with a longitudinal cylindrical bore, ports opening from said bore, means for connecting pipes with said ports, one of said ports being an end port, a plunger reciprocably and rotatably mounted in said bore and conformed on the periphery to provide predetermined passages between the bore and said plunger operating therein for different systems of communication between said port in different predetermined positions of rotary and endwise movement of said plunger, means for rotating said plunger, stop means for interrupting said rotary movement of the plunger, means for releasing said stop means, means for adjusting said stop means circumferentially relative to said plunger to regulate the degree of opening of the plunger controlled ports, means for automatically causing endwise movement of said plunger during part of its rotary movement, and a poppet type valve slidably and rotatably mounted on the end of said plunger in coaxial relationship thereto for cooperation with said end port in a certain position of endwise movement of the plunger.

References Cited in the file of this patent

UNITED STATES PATENTS

| Number | Name | Date |
|---|---|---|
| 960,558 | Koken | June 7, 1910 |
| 1,593,300 | Harwood | July 20, 1926 |
| 1,620,717 | Brice | Mar. 15, 1927 |
| 1,707,692 | Terbeest | Apr. 2, 1929 |
| 1,886,889 | Krupp | Nov. 8, 1932 |
| 1,909,755 | Cederstrom | May 16, 1933 |
| 1,957,044 | Johansson | May 1, 1934 |
| 1,963,633 | Spencer | June 19, 1934 |
| 2,052,827 | Hexamer et al. | Sept. 1, 1936 |
| 2,137,406 | Johnson | Nov. 22, 1938 |
| 2,165,096 | Frechette | July 4, 1939 |
| 2,182,459 | Vickers | Dec. 5, 1939 |
| 2,183,825 | Steffen | Dec. 19, 1939 |
| 2,220,170 | Nelson | Nov. 5, 1940 |
| 2,342,770 | Temple | Feb. 29, 1944 |
| 2,355,188 | Towles | Aug. 8, 1944 |
| 2,362,671 | Schwan | Nov. 14, 1944 |
| 2,408,680 | Pontius | Oct. 1, 1946 |
| 2,547,254 | Braithwaite | Apr. 3, 1951 |
| 2,618,291 | Vestre | Nov. 18, 1952 |

FOREIGN PATENTS

| Number | Country | Date |
|---|---|---|
| 317,777 | Great Britain | Aug. 22, 1929 |
| 573,894 | Great Britain | Dec. 12, 1945 |